United States Patent
Ganuza

(10) Patent No.: US 8,561,527 B2
(45) Date of Patent: Oct. 22, 2013

(54) TORTILLA TOASTER

(75) Inventor: Wilfredo Ganuza, Roselle, NJ (US)

(73) Assignee: Eden Variety Products, LLC, Roselle, NJ (US)

( * ) Notice: Subject to any disclaimer, the term of this patent is extended or adjusted under 35 U.S.C. 154(b) by 313 days.

(21) Appl. No.: 12/886,747

(22) Filed: Sep. 21, 2010

(65) Prior Publication Data

US 2011/0067579 A1    Mar. 24, 2011

Related U.S. Application Data

(60) Provisional application No. 61/277,377, filed on Sep. 24, 2009.

(51) Int. Cl.
| | | |
|---|---|---|
| *A47J 37/08* | (2006.01) | |
| *A47J 27/00* | (2006.01) | |
| *H05B 6/12* | (2006.01) | |
| *H05B 3/68* | (2006.01) | |

(52) U.S. Cl.
USPC .................. 99/393; 99/385; 99/391; 99/445; 219/621; 219/450.1

(58) Field of Classification Search
USPC ........... 99/450, 447, 446, 445, 449, 391, 389, 99/385, 482, 450.1; 426/312
See application file for complete search history.

(56) References Cited

U.S. PATENT DOCUMENTS

| | | | |
|---|---|---|---|
| 540,852 A * | 6/1895 | Cheney .......................... 126/369 |
| 1,039,261 A * | 9/1912 | Cornwell ....................... 220/759 |
| 1,906,999 A * | 5/1933 | Parker ............................. 99/349 |
| 2,439,283 A * | 4/1948 | Bennett .......................... 99/450 |
| 2,860,624 A * | 11/1958 | Eddy ............................ 126/25 R |
| 3,478,704 A | 11/1969 | Ford | |
| 3,511,172 A | 5/1970 | Jones | |
| 3,693,537 A | 9/1972 | Johnson et al. | |
| 3,745,911 A | 7/1973 | Kennedy, Jr. et al. | |
| 3,759,165 A | 9/1973 | Wallace | |
| 3,880,064 A | 4/1975 | Martinez | |
| 4,013,869 A | 3/1977 | Orts | |
| 4,147,924 A | 4/1979 | DeWitt, Jr. | |
| 4,154,155 A | 5/1979 | Brignall | |
| 4,206,345 A * | 6/1980 | Maass et al. ................... 219/524 |
| D266,733 S * | 11/1982 | Reunanen ....................... D7/359 |
| 4,517,887 A | 5/1985 | Childress | |
| 4,569,851 A | 2/1986 | Schultz | |
| 4,884,499 A * | 12/1989 | Rensch et al. .................. 99/449 |
| 4,976,195 A | 12/1990 | Cavazos | |
| 4,987,827 A | 1/1991 | Marquez | |
| 5,309,826 A | 5/1994 | Ortiz | |

(Continued)

FOREIGN PATENT DOCUMENTS

| | | |
|---|---|---|
| ES | 2 018 998 AF | 5/1991 |
| MX | PA 97005204 A | 7/2002 |
| WO | WO 86 / 02246 | 4/1986 |

*Primary Examiner* — Quang Van
*Assistant Examiner* — Michael Hoang
(74) *Attorney, Agent, or Firm* — Gearhart Law, LLC

(57) ABSTRACT

The present invention discloses a cooking apparatus having a pan with a sidewall, a bottom wall and a grill top. The bottom wall has a top surface and a bottom surface, with the bottom surface facing a heating source and the top surface facing an air space. A grill covering is disposed on top of the sidewall, with the air space forming between the grill covering and the top surface of the bottom wall. The sidewall also contains at least one handle.

13 Claims, 5 Drawing Sheets

(56) References Cited

U.S. PATENT DOCUMENTS

| | | |
|---|---|---|
| 5,400,704 A | 3/1995 | Huston |
| 5,628,245 A | 5/1997 | Baze |
| 5,765,471 A | 6/1998 | Monard |
| 5,845,562 A | 12/1998 | Deni et al. |
| 6,155,162 A | 12/2000 | Wang |
| D436,797 S | 1/2001 | Huang et al. |
| 6,205,911 B1 | 3/2001 | Ochoa |
| 6,268,592 B1 | 7/2001 | Hu et al. |
| 6,477,943 B2 | 11/2002 | Janecka |
| 6,546,844 B1 | 4/2003 | Trevino |
| 6,668,708 B1 | 12/2003 | Swinford et al. |
| D513,150 S | 12/2005 | Asner |
| 7,047,871 B1 | 5/2006 | Christoffel |
| 2003/0213378 A1* | 11/2003 | Farrow ............ 99/450 |
| 2008/0028950 A1 | 2/2008 | Vasquez |
| 2009/0049990 A1* | 2/2009 | Schutte ............ 99/339 |
| 2009/0311393 A1* | 12/2009 | Estess et al. ......... 426/312 |

\* cited by examiner

TORTILLA TOASTER

CLAIM OF PRIORITY

This application claims the priority of U.S. Ser. No. 61/277,377 filed on Sep. 24, 2009, the contents of which are fully incorporated herein by reference.

FIELD OF THE INVENTION

The invention relates to a food preparation device, in particular a flat bread finishing apparatus.

BACKGROUND OF THE INVENTION

The invention relates to a device used for heating up or toasting a food item, in particular, a flat bread, such as, but not limited to a tortilla, pita, naan, or other flatbreads, including crackers and rice cakes. These food items are more desirable when browned, but are notoriously difficult to toast in a conventional toaster device, due to their predominantly elliptical shape and thin profile that is predisposed to drying or burning, and also due to the shortcomings of existing devices.

The present invention requires a steady source of heat, such as a stove top or a barbeque grill top. The hot air from a stove top warms the bottom surface and an air space, which separates the bottom wall from the grill top. The air gap serves as an efficient conductor of heat, while preventing a food item from getting burned. A plurality of openings in the bottom wall further facilitates the flow of thermal energy, thus quickening the toasting process.

The design of the present invention is simple and inexpensive to manufacture, translating into an affordable and desirable consumer product. Furthermore, the preferred embodiment of the present invention utilizes a range top, a grill top or any other heat source to enable toasting of a food item. In contrast the prior art devices frequently require an electrical outlet or are designed for use with a specific heat source.

Although grilling, barbequing and toasting devices are generally well known, they all contain a number of shortcomings that the present invention aims to redress. The existing toaster devices are focused on bread slices, and many of the devices that were actually invented with flatbreads in mind require difficult setups, are designed for conveyer production and are unsuitable for home use, or require other cooking utensils or devices to operate.

DESCRIPTION OF THE RELATED ART

U.S. Patent App. No. 2008/0028950 discloses a cooking utensil for frying a tortilla into a taco shell comprises a shell section having first and second U-shaped shell members and a handle assembly that linearly biases the second shell member into nested relation with the first shell member. A brace member attaches to the first shell member. The first end of an outer tubular shaft attaches a first handle member and its second end slidably attaches to the brace member. An inner shaft having a first end attached to a second handle member and a second end pivotally attached to the second shell member is slidably disposed in the outer shaft. The first handle member has a cavity that receives the second handle member, which is biased outwardly from the cavity by a spring. A user supplied anti-biasing force separates the first and second shell members for insertion of the tortilla and removal of the taco shell.

U.S. Pat. No. 7,047,871 shows an apparatus 10 for a toaster appliance having at least one circular-like carriage 14 forming a support element for food articles 12 such as tortillas, pita, naan and other flatbreads during a warming/toasting session. The support walls 16, 20 are comprised of wire mesh 18 with one side having a partial lower peripheral rim or lip 38 positioned flange extending thereinbetween acting as a carriage for the food article. Diametrically opposed is the other support wall that is spaced over the depending flange 38 extending from the other wall. Adjacent coplanar posts or pins 36 extend from the mesh-walls 16, 20 traveling in and through guide tracks 40 located at each end of the interior housing 24 with tensioning members 34 fastened to the post distal ends keeping the support walls compressed. One of the tracks 40 is of greater width thereby providing for variable thickness of the food article, which is held by the tensioned mesh walls 16, 20. One rail of the interiorly positioned track 40 is substantially vertical while the other is angularly divergent so that when the tray is in the food article receiving position, the walls 16, 20 are spaced apart providing means for inserting and removing food articles 12 without engaging the mesh-like walls.

U.S. Pat. No. 6,546,844 discloses a tortilla warming appliance for warming one or more tortillas in a manner similar to a toaster. The tortilla warming appliance comprises a collapsible tortilla cage for each tortilla and a push-down, pop-up, arc-shaped cradle assembly slidably coupled in a respective tortilla cage. The cradle assembly has a concave center section, which defines an arc that approximates a curved perimeter edge of the tortilla. Furthermore, the width of the front and back tortilla cage wall is greater than the diameter of a commercially available tortilla.

Various implements are known in the art, but fail to address all of the problems solved by the invention described herein. One embodiment of this invention is illustrated in the accompanying drawings and will be described in more detail herein below.

SUMMARY OF THE INVENTION

The present invention discloses a cooking apparatus having a pan with a sidewall, a bottom wall and a grill top. The bottom wall has a top surface and a bottom surface, with the bottom surface facing a heating source and the top surface facing an air space. A grill covering is disposed on sop of the sidewall, with the air space forming between the grill covering and the top surface of the bottom wall. The sidewall also contains at least one handle.

Therefore, the present invention succeeds in conferring the following, and others not mentioned, desirable and useful benefits and objectives.

It is an object of the present invention to provide a device for warming and toasting flatbreads It is another object of the present invention to provide a device that is lightweight, inexpensive and simple to manufacture.

Yet another object of the present invention is to provide a device that is capable of quickly toasting flatbreads without burning them.

Still another object of the present invention is to provide a device that is simple to place and remove from a heat source.

Still another object of the present invention is to provide a flatbread warming device that is capable of functioning with a variety of heat sources.

Yet another object of the present invention is to provide a device that may be manufactured in a variety of shapes and sizes without compromising or altering its utility.

Still another object of the present invention is to provide a device that is easy to clean and maintain.

DESCRIPTION OF THE PREFERRED EMBODIMENTS

Figure 1:
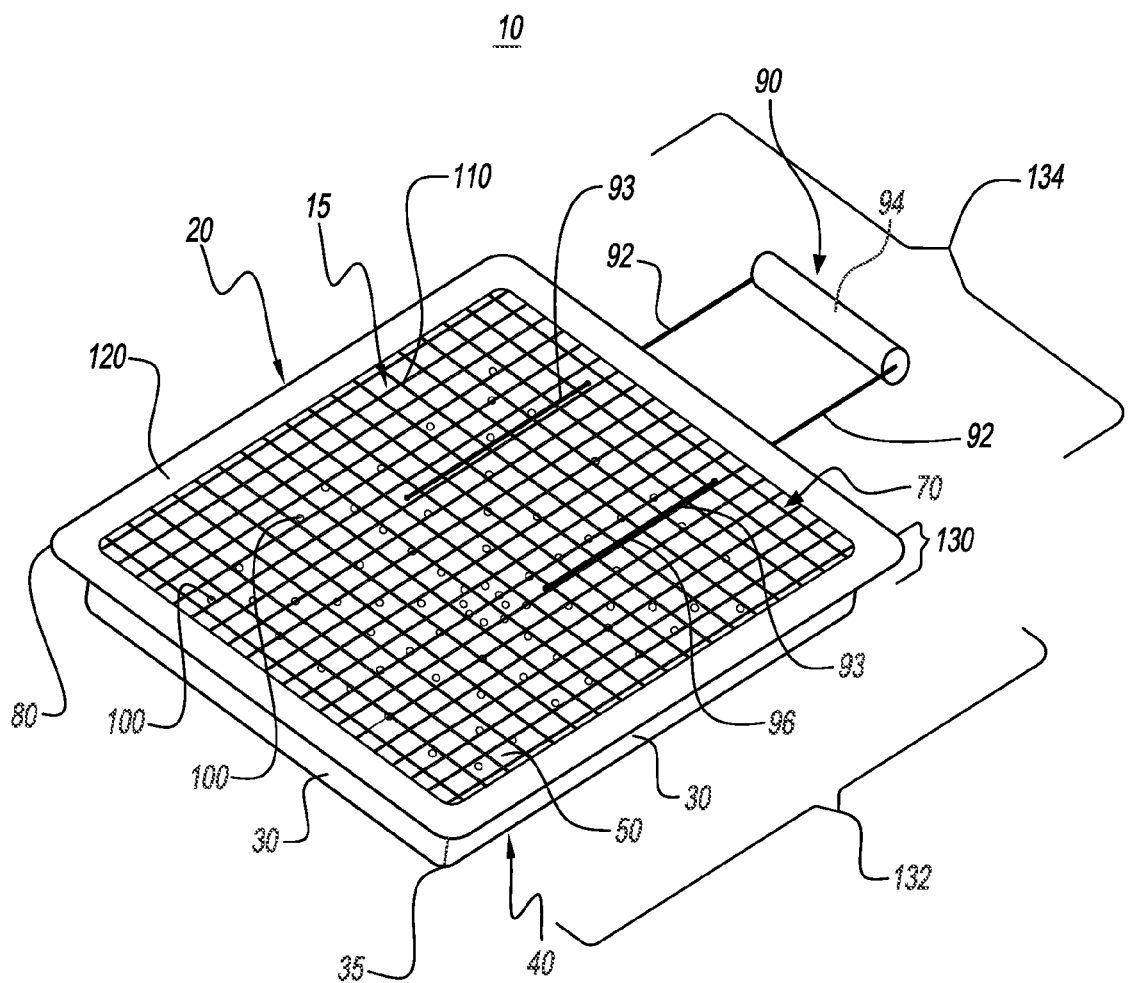
FIG. 1 is a perspective view of the preferred embodiment of the present invention showing a single toaster.

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 is shows a preferred embodiment of the present invention. Shown are a cooking apparatus 10; made up of a pan 20, sidewalls 30 that form corners 35, a bottom wall 40 that contains a top surface 50, and a grill covering 70. Other structural elements include, a top of the sidewall 80, a handle 90, a handle arm 92, a grip section 94, a mount section 96, openings 100, a wire mesh 110, a top lip 120, a distance 130, a length 132, and a width 134. An air space 15 is located between the grill covering 70 and the top surface 50 and is further encased on all sides by a sidewall 30. The apparatus 10 may preferably be utilized in the art of food preparation, in particular, for toasting a fully cooked food item.

The present invention must have an enabling heat source, and shall preferably be able to withstand prolonged direct exposure to open flame or hot coils. Additionally the present invention may preferably be able to attain an optimal cooking temperature quickly, and disperse it evenly throughout the apparatus 10. The grill covering 70 accepts and supports the food item that is being toasted.

Heat must be dispersed quickly and efficiently since the targeted food items are usually already fully cooked and will therefore be burned or otherwise ruined if exposed to prolonged or uneven heat. The main conduit for rapid and efficient cooking is the air space 15 that exists within the distance 130 between the top surface 50 of the bottom wall 40 and the grill covering 70. As thermal energy travels from the heat source through the bottom wall 40, it quickly mixes with the air within the airspace 15. The preferred length of the distance 130 is between ¼ of an inch and 2 inches. The distance 130 may also be described as the thickness of the device and may be substantially equal to the height of the sidewall 30, since the grill covering 70 is preferably thin and made from thin metal wire or another low profile, but strong and heat resistance material. The sidewall 30 meets the bottom wall 40 at a substantially 90 angle, but a flared outward or a flared inward sidewall 30 may also be used, to either create more cooking space on the grill covering 70 while utilizing the same heat source, or to funnel heat in a more directed fashion, as in the case of the inward flaring or the sidewall 30.

The airspace 15 is preferably uniform, meaning there are no internal obstructions or partitions that may interfere with the mixing of the heated air from a heat source, such as a burner 145 (FIG. 4), below the bottom wall 40 and the cooler air within the airspace 15. The heated air preferably enters the airspace 15 through openings 100. However, openings 100 may not be necessary and the thermal energy may be initially transferred to the cooler air 15 through a confectionary process. In such an embodiment, once the air molecules near the top surface 50 heat up, they quickly spread their agitated state to neighboring cooler air molecules, thus creating a heated air mixture. However, such heat transfer process may be slower then when the openings 100 are present and may be used as a means of controlling the warming rate and temperature that the food item is exposed to. Additionally a separate insert or an outer pan may be provided that lacks the openings 100, and which will entirely cover the openings 100, thus slowing the heating process and lowering the temperature of the airspace 15 as desired. In yet another embodiment, the bottom wall 40 may be entirely omitted, and replaced with parallel horizontal bars or legs (not shown), or any other support means. These bars or legs would be capable of supporting the sidewall 30 and the grill covering 70 at a particular elevation above a heating source, and thus create a funnel that quickly heats up the airspace 15 and toasts the food item lying on top of the grill covering 70. In such an embodiment, the airspace 15 would exist between the heat source and the grill covering 70 and would be enclosed on all sides by a sidewall 30.

The pan 20 is shown as substantially square in shape, but may also be round, rectangular or in any other shape. The square shape may be more preferable when the present invention utilizes a conventional range top burner 145 (FIG. 4), which is substantially square. A square shape of the present invention would then provide the most heat protection to the operator of the device, since conventional gas burners are substantially square. However, a round pan 20 may be better suited for range tops having electrical coil burners (not shown), which are predominantly round. Also a round pan 20 may heat up more quickly since no heat escapes through the corner area 35. The pan 20 is shown with a substantially flat bottom wall 40, which may also be in a convex or a concave shape. Although a flat bottom wall 40 may be preferable, there are instances where a more elliptical or tapered bottom may be preferable, for example in an open hearth cooking.

The present invention may be self powered by having a heat source area below the bottom wall 40 or the airspace 15. The heat source may be an electrical coil or fuel driven, and the sidewall 30 may contain an adjustment knob to initiate the heat source and control its temperature. Such an embodiment would require a power cord that is plugged into a wall outlet or an electrical generator, or it would require a fuel canister, for a flaming type heating source. In yet another embodiment, the heating coils or burners may be disposed directly within the air space 15. Such heating coil or burner would preferably still leave a substantial airspace between itself and the grill covering 70, thus avoiding burning, scorching or over-drying of the food item.

The present invention must tolerate prolonged exposure to heat of up to 500 F or more, if desired. Therefore, the pan 20, also referred to as a single pan, as well as the double pan 150 should preferably be made for a material, such as, but not limited to aluminum, iron, steel, lead or any composite material or an alloy, such as stainless steel, or from any other non-flammable material, having a high melting point and good thermal conducting qualities. The pan 20 may be preferably between 5 and 8 inches in length 132, and with an equal value range for the width 134. However, larger pans 20 may be used to accommodate high volume, commercial, or social cooking and smaller sizes may be used for individual, home and portable applications of the preset invention.

The bottom wall 40 may preferably be between 0.079 and 0.197 inches thick and would preferably contain a plurality of equally spaced openings 100. The openings 100 may form a design or some kind of a symbol as in promotional use. However, the main intent of the openings 100 is to accelerate the infusion of heat flow into the airspace 15. The openings 100 are shown to be circular, but may be star shape, square, elliptical, or slot shape, or in any other shape. The openings 100 may be small in comparison to the width of the cooking apparatus and are preferably less than ¼ inch in diameter, and more preferably less than ⅛ th of an inch in diameter. The holes 100 are also preferably formed by punching up through the bottom of the cooking apparatus so that they have a small lip around their circumference that may prevent any oil or other drippings falling back into the grill. The lips of the holes 100 preferably extend upwards less than ¼ of an inch, and more preferably less than ⅛ th of an inch.

The grill covering 70 may preferably be an interlocking wire mesh. A wire mesh 110 is preferred since it creates a light weight, thin, and yet strong supporting surface for a food item, which at the same time exposes as must of the food item to the hot air as possible. An additional benefit of using a wire mesh 110 is that the exposure of the food item to the scorching metal support surface is kept to a minimum. Alternatively, a series of parallel bars or a plane surface, with our without openings, may also be used for a grill covering 70.

The grill covering 70 may preferably be supported at the wall top 80, which may be in a shape of a top lip 120. The grill covering 70 may be fastened onto the top lip 120 or the wall top 80, or may be loosely placed on such and held down by gravity coupled with the weight of a food item being toasted. Preferably however, the grill covering 70 is disposed within a top lip 120, with the top lip 120 capable of fixating a grill covering 70.

Many alternative embodiments of the toaster are possible. For example, a second grill covering (not shown) may be disposed on top of the grill covering 70 or the main grill covering. There would preferably be enough space between these grill coverings to insert at least one typical food item, such as a tortilla. The second grill covering may be freely removable like a cover, or it may be attached to the grill covering 70, or the top lip 120, or the wall top 80 with a hinge. A second grill covering may additionally have a handle or a location for holding and easy handling of the second grill covering, which may become hot when in use. A space between the grill coverings may be enabled by a projecting wall top 80 or a top lip 120 or an appendage (not shown) or an insert (not shown), or in any other way.

In another alternative, two minor images of the apparatus 10 may be disposed on top of each other, with grill coverings 70 facing each other (not shown). In such an embodiment one pan 20 or a multi-item pan 150 would be on top of a heat source, with a second pan, which would be another pan 20 or multi-item pan 150, disposed upside down above it, with grill coverings 70 facing each other. There would be a space in between grill coverings 70 for at least one typical food item. This space would be created either with an extended wall top 80, or a top lip 120, or an insert (not shown). The two pans may be freely detachable or may have a hinge on one side, and perhaps also a locking mechanism. In this embodiment, one need not have to touch the food item in order to flip it to the other side, rather one turns over the entire apparatus 10, with the pan 20 or a multi-item pan 150 previously on top being disposed on the bottom and over a heat source, and the other pan 20 or a multi-item pan 150 previously on top of the heat source now being disposed on top and upside down. Thus, second pan is disposed on top of a pan 20 or a multi purpose pan 150, which effectively is a first or main pan. The grill coverings 70 of the first pan and of the second pan face each other across an air gap. The air gap is used to insert and heat a food item between the grill coverings 70 of the two pans 20 or 150.

The top lip 120 may be formed by bending the entire width of a segment of the sidewall top 80 outwardly and then by bending approximately half of this segment back inwardly, thus creating a "V" shaped or less then "<" shaped lip 120. The grill covering 70 is then inserted into the airspace between the two bent segments. Such disposition of the grill covering 70 may removable if a section of the top lip 120 can be bent back upwardly or to remove a grill covering 70, which may be a wire mesh 110. Such bending may be accomplished with the help of a hinge and may be additionally secured in a closed position with a fastener or a hook and a loop. Alternatively, the top lip 120 may be permanently shaped and unbendable, in such case the grill covering 70 may be slightly deformed so as to be inserted within the top lip 120. A removable grill covering 70 may be preferred since it would permit adequate cleaning of it and of the inside surfaces of the bottom wall 40 and the sidewalls 30. Alternatively, the grill covering 70 may be permanently fixated or disposed within the top lip 120 or within the wall top 80.

In another alternative, the airspace distance 130 may be expandable or variable. For example, the sidewall 30 may contain holes, notches or flanges that are disposed at regular or irregular intervals in a ladder configuration, meaning, one below another, creating identifiable horizontal levels. These holes notches or flanges disposed at a particular level would combine to provide a support structure for a level and flat grill covering 70. In such embodiment, a user may intensify or lessen the cooking rate of a food item by moving the grill cover upwards or downwards along the ladder configured posts, notches, openings or flanges, and securing the grill cover 70 within such, once a desired distance from the wall bottom 40 or the heating source has been reached. Another way to adjust the cooking or grilling duration of a food item is by manipulating the intensity of the heat source, such as a burner 145, or by lowering the heat setting of a knob of a self heating embodiment of the present invention.

The handle 90 is preferably a section of a wire that is bent into a loop, with resulting parallel appendages 93 being mounted within openings 100 or within a separate mount section 96 of the bottom wall 40 or a sidewall 30. A grip section 94 may provided to protect one's hand from scolding heat of the handle arm 92. The grip section 94 is preferably oriented like a handle of a skillet, being substantially perpendicular to the axis of the sidewall 30. Alternatively, the handle arm 92 may be fastened unto one of the sidewalls 30, or the bottom wall 40, or the top lip 120. In an alternative embodiment, there may be more than one handle, or a section of the top lip 120 may be fashioned into finger holds. The handle 90 may also be shaped into an arch with two ends of the arch mounted on opposite sides 30 or opposite corners 35 of the pan 20. Such a handle 90 would permit handling of a pan 20 in a suspended, balanced fashion, just like a basket. The top lip 120 or the sidewall top 80 may additionally have a raised border or a lip that would act to prevent any runoff of a food item that has melted during toasting, such as cheese.

In yet another alternative embodiment, the pan 20 would have a cap for the grill covering 70, and any food item being supported by it. Such a cap may be permanently attached via hinge and would be capable of swinging away to reveal the grill covering 70. The cap may have a handle, a locking latch or a temperature gauge or any combination thereof. A simpler embodiment of a cap would be a convex cover that may be placed on top of the top lip 120 and which would be capable of remaining in place frictionally, being supported by the force of gravity.

Figure 2:
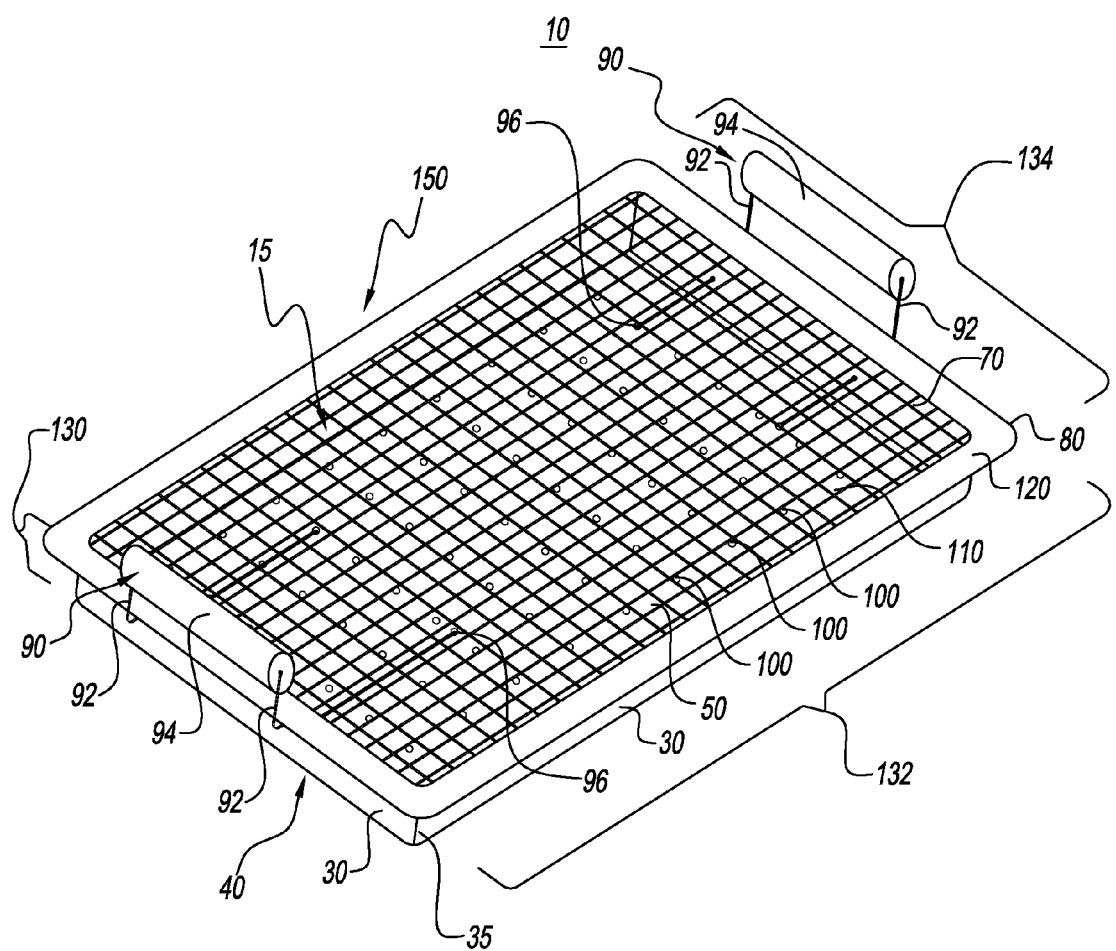
FIG. 2 is a perspective view of an alternative embodiment of the present invention, showing a double toaster.

FIG. 2 shows another embodiment of the present invention. Shown is a double pan 150. A double pan 150 is in a shape of a rectangular pan with a pair of handles 90 that have a grip section 94 running above and parallel to the top lip 120 or the wall top 80. The wire forming two strands of the handle arm 92 then terminates within a mount point 96, which may double as one of the openings 100 within the bottom wall 40. It may be preferable that the double pan 150 is sized so as to be able to fully or partially extend over two burners 145, and be able to process at least twice as many food items in the same period of time as a pan 20. Also shown in FIG. 2 are an apparatus 10, a sidewall 30, a corner 35, a bottom wall 40, a top surface 50, a grill covering 70, a top of the sidewall 80, a wire mesh 110, a top lip 120, a distance 130, a length 132, and a width 134. The length 132 is preferably between 1 and a half to twice the value of the width 134.

Figure 3:
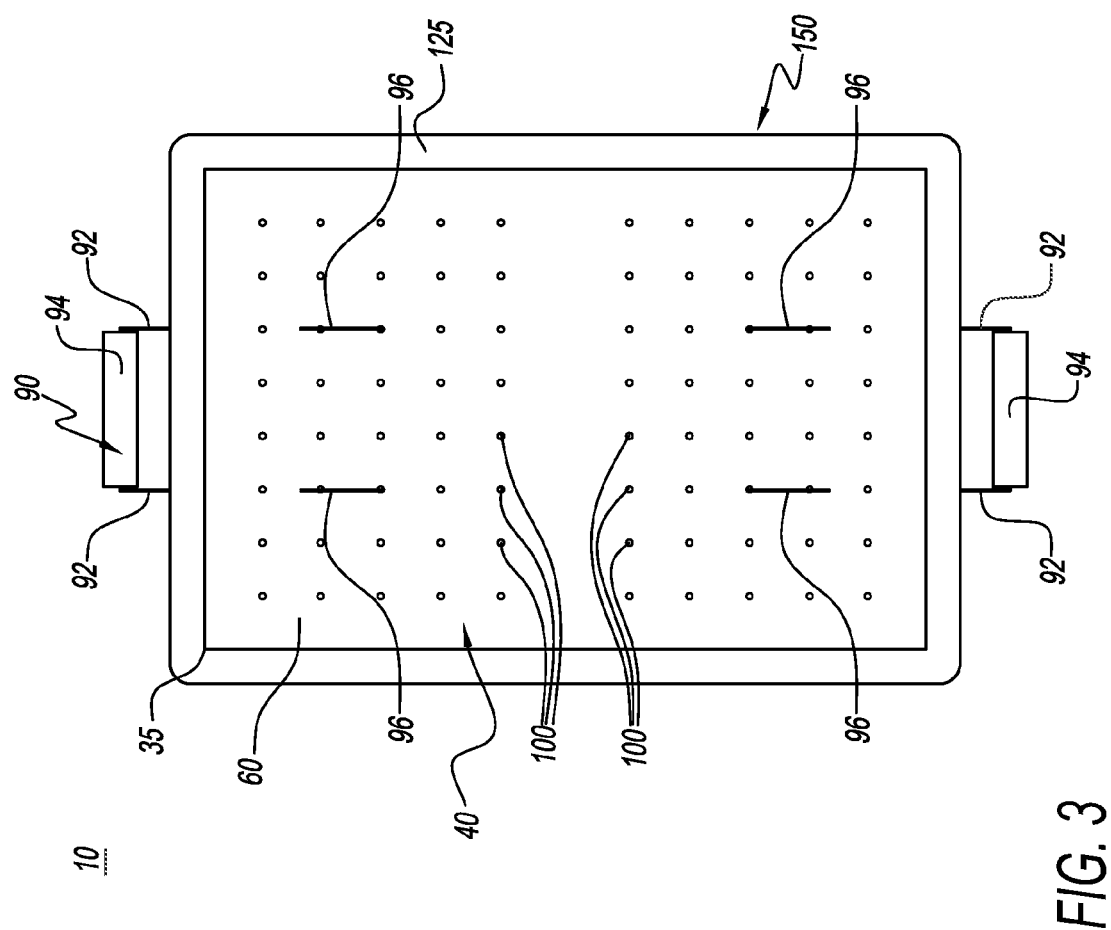
FIG. 3 is a bottom view of the present invention and that of an alternative embodiment, showing the difference in size between the two embodiments.
Figure 3:
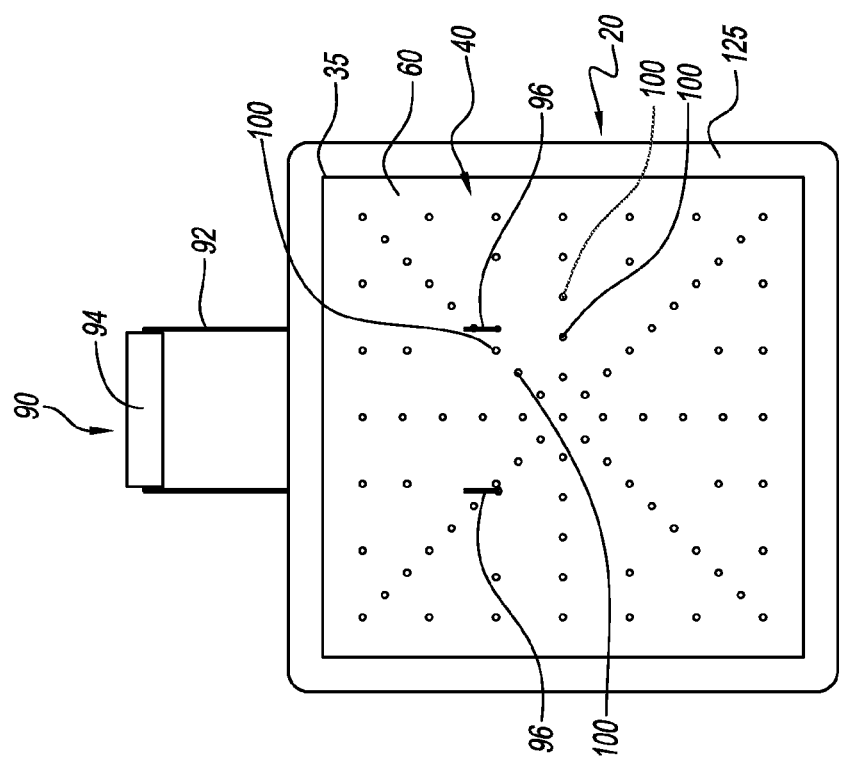

FIG. 3 shows the bottom surface 60 of the bottom wall 40. Also shown are a cooking two cooking apparatuses 10, a pan 20, corners 35, a bottom flange 125, handles 90, handle arms 92, grip sections 94, mount sections 96, openings 100, and a multi item pan 150. The bottom wall 40 may additionally have structural ribs or surface accents that may be pressed into the bottom wall 40 or attached to it with welding, gluing, fastening, tying or crimping. These may delay or prevent any deformation that may result when the present invention is exposed to a high degree of heat over a protracted period of time. The bottom flange 125 is the bottom side of the top lip 120 which may preferably be shaped in a sideways "V" or a "<" sign.

The present invention may be presented as a kit for finishing food items. This kit may be made of a single item pan 20 or a multi-item pan 150. A single item denoting a single item of food, while a multi item denoting several items of food being cooked simultaneously. Alter natively the single item pan 20 may be used to cook several items of food and a multi item pan 150 may be used to process a single item of food.

Alternatively, a kit may be made items that would be enable one to create an embodiment of the present invention food toaster. For example, such a kit may include a hole-puncher for creating openings 100 in a conventional disposable aluminum pan. Additionally such a kit may include a grill covering 700 and/or handles 90.

Figure 4:
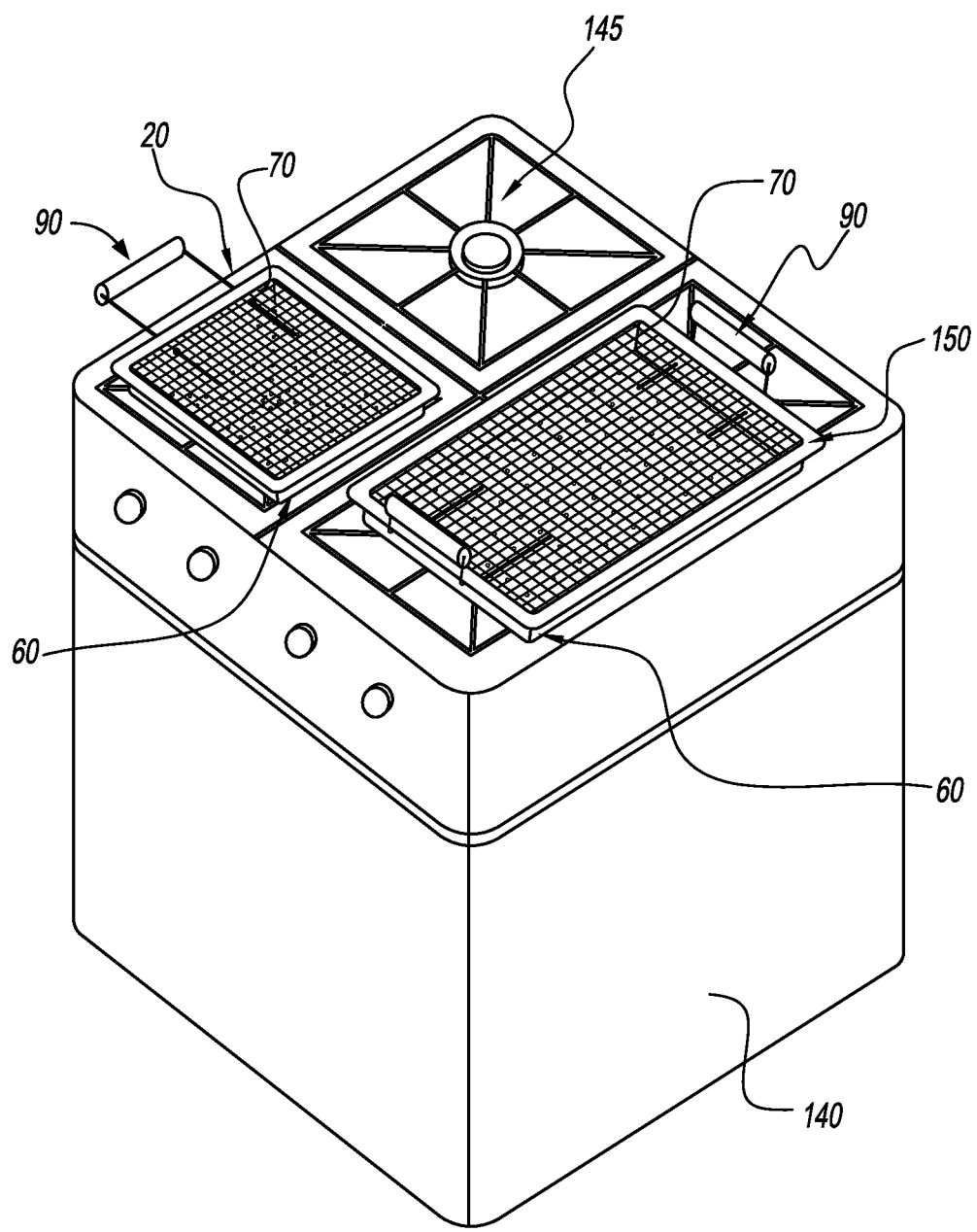
FIG. 4 is a description of one application of the present invention, where several embodiments of the present invention are shown being used with conventional stove top burners.

FIG. 4 illustrates one preferred use of the present invention. Shown are a pan 20 and a multi item pan 150 that are placed on top of burners 145 of a conventional range 140. The burners 145 are shown to be gas burners, but may also be electric burners. Additionally the present invention may be placed on top of the grill bars of a conventional gas or coal fired grill oven. The present invention may also be used with open hearse cooking or a campfire with the addition of legs or an arching handle (not shown) that may be used to suspend the present invention above a flame. FIG. 4 illustrates that a multi-item pan 150 should preferably contain several equally spaced sources of heat, while a pan 20 may preferably be used with just one source of heat. The pan 20 and a multi-item pan 150 may not require an external heating source, but rather have an internal heating source, with an electrical or fuel powered heating source or sources. In such an embodiment the pan 20 or a multi-item pan 150 may be removable from a internal heating source and be utilized with the external heating source or may be utilized with an external heating source despite the presence of or in addition to an internal heating source.

The present invention may be used by placing a food item, preferably a flat bread type of a food item the wire mesh 110, or any other type of surface comprising a grill covering 70. The pan 20 is then placed on top of an external heating source such as a burner 145 or a grate of a barbeque grill, or an internal heating source would now be started up. Alternatively the pan 20 or a multi-item pan may be preheated to a required temperature with flat bread being placed on top of the grill covering 70 once this temperature has been reached.

Figure 5:
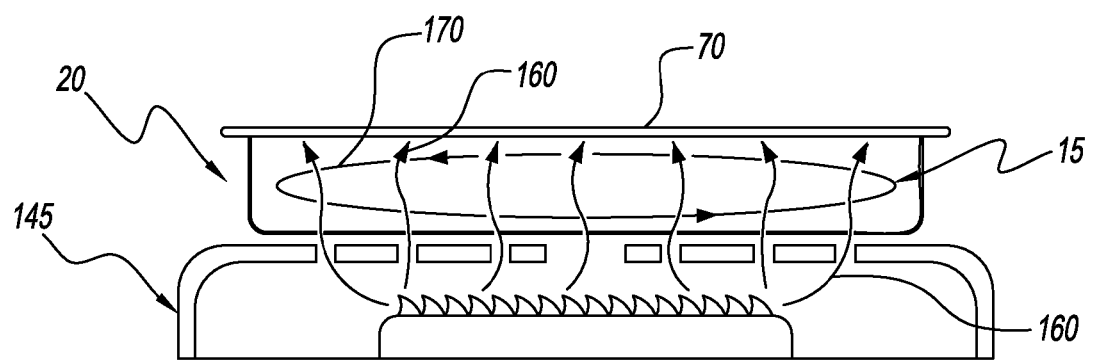
FIG. 5 is a cross sectional diagram of the apparatus being heated on top of a burner.

FIG. 5 shows an apparatus 10, which may either be a pan 20 or a multi-item pan 150. The apparatus 10 has been placed on top of a burner 145. The heat from the burner 160 percolates into the inner cavity 15 through the openings 100 of the apparatus 10 and begins circulate and warm the air 170 within the inner cavity 15. Eventually the heated air 160 rises toward the grill covering 70. The intermixing of the thermal energy from the heat source or the burner 145 and the inner air 170 occurs quickly and uniformly, thus rapidly exposing the food item placed on the grill top 70 to intense heat. At the same time, the grill top 70 does not get heated as quickly as the food item, therefore a user is able to achieve a desired finishing effect on the food item with less risk of burning or scolding it.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A cooking apparatus comprising:
    a pan, said pan having a sidewall, and a bottom wall,
    said sidewall having a top lip having two bent segments, comprising an outward segment bending a top of the side wall outwardly and an inward segment bending inwardly,
    said bottom wall having a top surface, a bottom surface, and a plurality of openings with less than ⅛ inches in diameter through the bottom wall,
    wherein the openings are punched from the bottom surface up to the top surface, with opening lips encircling the openings and extending upwards less than ¼ inches;
    a grill covering made of interlocking wire mesh and disposed between the two bent segments of the top lip of said sidewall,
    wherein a distance between the top surface and the grill covering is ¼ to 2 inches;
    at least one handle having parallel appendages being mounted within said openings; and
    a uniform air space separating said top surface and said grill covering.

2. The cooking apparatus of claim 1, wherein said pan is circular.

3. The cooking apparatus of claim 1, wherein said pan is square.

4. The cooking apparatus of claim 1, wherein said pan is rectangular.

5. The cooking apparatus of claim 1, further comprising at least two handles.

6. The cooking apparatus of claim 1, wherein said grill covering is removable.

7. The cooking apparatus of claim 1, wherein a distance between said grill covering and said top surface is capable of being varied.

8. The cooking apparatus of claim 1, further comprising a second grill covering.

9. The cooking apparatus of claim 1, further comprising a second pan having a second grill covering, said second pan disposed on top of said pan wherein said grill coverings of said pan and said second pan face each other across an air gap.

10. A cooking kit comprising;
- a single item pan, said pan being square and having a first sidewall, a first bottom wall, at least one first handle and a first grill covering, said first bottom wall having a first top surface, a first bottom surface, and a plurality of first openings with less than ⅛ inches in diameter through said first bottom wall, said first bottom wall capable of covering a top of a stove burner, and a first uniform air space separating said first top surface and said first grill covering, wherein
- said first sidewall has a first top lip having two first bent segments, comprising a first outward segment bending a top of the side wall outwardly and a first inward segment bending inwardly,
- said first handle has parallel appendages being mounted within said first openings;
- the first openings are punched from the first bottom surface up to the first top surface, with first opening lips encircling the first openings and extending upwards less than ¼ inches;
- a said first grill covering made of interlocking wire mesh and disposed between the two first bent segments of the first top lip of said first sidewall,
- and a distance between the first top surface and the first grill covering is ¼ to 2 inches; and
- a multi item pan, said pan being rectangular and having a second sidewall, a second bottom wall, at least one second handle, and a second grill covering, said second bottom wall having a second top surface, a second bottom surface, and a plurality of second openings with less than ⅛ inches in diameter through said second bottom wall, said second bottom wall being capable of covering a top of at least two stove burners, and a second uniform air space separating said second top surface and said second grill covering, wherein
- said second sidewall has a top lip having two bent segments, comprising a second outward segment bending a top of the side wall outwardly and a second inward segment bending inwardly,
- said second handle has parallel appendages being mounted within said second openings;
- the second openings are punched from the second bottom surface up to the second top surface, with second opening lips encircling the second openings and extending upwards less than ¼ inches;
- the second grill covering made of interlocking wire mesh and disposed between the two second bent segments of the second top lip of said second sidewall,
- and a distance between the second top surface and the second grill covering is ¼ to 2 inches.

11. The cooking apparatus of claim 10, wherein the first grill covering is removable.

12. The cooking apparatus of claim 10, wherein the distance between said first grill covering and the first top surface of said first bottom wall is capable of being varied.

13. The cooking apparatus of claim 10, wherein said first handle is a wire loop.

* * * * *